United States Patent Office 3,524,504
Patented Aug. 18, 1970

3,524,504
WELL STIMULATION WITH VAPORIZATION OF FORMATION WATER
Joseph C. Allen, Bellaire, Tex., assignor to Texaco Inc., New York, N.Y., a corporation of Delaware
No Drawing. Filed Aug. 8, 1968, Ser. No. 753,839
(Filed under Rule 47(b) and 35 U.S.C. 118)
Int. Cl. E21b 43/24
U.S. Cl. 166—303     4 Claims

ABSTRACT OF THE DISCLOSURE

A method of stimulating a subterranean hydrocarbon-bearing formation by injecting therein a heated non-aqueous fluid at a temperature sufficient to vaporize the water contained in the formation. Preferably, the injected fluid is miscible with the hydrocarbons contained in the formation and has a vapor pressure below that of the water contained therein.

BACKGROUND OF THE INVENTION

This invention relates generally to an improved method of stimulating a subterranean hydrocarbon-bearing formation. More particularly, this invention relates to a method wherein a heated non-aqueous fluid is injected into the formation.

Stimulation of subterranean hydrocarbon-bearing formations has been successful in a number of recent applications. The injection of a heated fluid is desirable, particularly in those formations containing highly viscous hydrocarbon materials. Steam injection is notably well suited for this purpose, since the energy contained therein effectively reduces the viscosity of the hydrocarbons and permits production thereof. Increased production rates experienced after steam injection have been attributed primarily to the viscosity reduction of the hydrocarbons and the wetting of solid hydrocarbons which reduces the retentive forces thereby allowing dislodgement thereof. Although the steam injection process has proven effective in certain fields, it does not reduce water saturation and water permeability in the formation adjacent the well bore. The invention herein disclosed provides the above enumerated benefits of the steam injection process and further improves the formation permeability thereby allowing a greater flow capacity therethrough.

SUMMARY OF THE INVENTION

Well stimulation is provided by injecting into the formation a non-aqueous fluid at a temperature sufficient to vaporize the water contained in the formation, followed by a soaking period sufficient to vaporize a substantial quantity of water contained in the formation. Subsequently, the pressure within the well bore is reduced to below that in the formation, with the well then being opened and hydrocarbons produced therefrom.

The principal advantage of the method contained herein over prior art methods is that effective stimulation of the formation is provided in conjunction with reducing water saturation in the formation. Injection of a heated non-aqueous fluid causes vaporization of the water in the area adjacent the well bore and is in effect in situ steam generation. This in situ steam generation provides all the beneficial attributes of well stimulation by means of injecting steam. However, no additional aqueous fluid is introduced into the formation. By the method of this invention, the water contained in the formation is readily vaporized, thereby reducing the water saturation and increasing the permeability of the formation. Further, the method disclosed herein imparts heat to the formation to reduce the viscosity of the hydrocarbons and permit recovery thereof.

Accordingly, it is a primary object of this invention to provide an effective method of stimulating a hydrocarbon-bearing formation.

A further object of this invention is to provide a method of improving the permeability of a water saturated formation.

These and other objects, advantages and features of the invention will become more apparent from the following description of one embodiment of the invention.

DESCRIPTION OF THE PREFERRED EMBODIMENT

With the method of this invention, hydrocarbon-bearing formations are effectively stimulated and the permeability thereof is increased by means of injecting therein a heated non-aqueous fluid. The non-aqueous fluid is injected into the formation in a quantity sufficient to raise the temperature of the formation fluids above the vaporization temperature of water at the prevailing pressure in the formation. Water in the formation is thereby vaporized, resulting in an increased permeability of the formation. In addition, treatment in accordance with the method disclosed herein is applicable to the restoration of the water permeability of formations previously damaged on contact with water. Particularly adaptable is treatment of a petroleum producing formation which evinces or has experienced a water block in the vicinity of the well bore. This water block or zone of reduced oil permeability may have been brought about, after the well has been shut in, by the injecting of water back into the producing formation, in which event, a producing formation in the zone immediately adjacent or surrounding the well bore will contain a substantial amount of water or will be subsequently saturated therewith, and will evince a low oil permeability.

Any type of non-aqueous heated fluid at a temperature sufficient to heat the formation fluids to a temperature above that of saturated steam under the pressure existing therein will suffice to accomplish the method of this invention. Examples of gases which may be utilized as the non-aqueous fluid are carbon monoxides, carbon dioxide, methane, ethane, oxygen, air, nitrogen and liquefied petroleum gas. A preferred liquid is one which has a vapor pressure below the vapor pressure of water and is miscible with the hydrocarbons contained in the formation. Examples of the preferred classes of liquids which may be utilized as a fluid are hydrocarbons having from five to eight carbon atoms, toluene, naphtha and aromatics.

Well stimulation may be provided to increase injection rates which have been lowered due to the presence of water saturation in clay materials contained in the formation. Injection of a low mineral content water, sometimes used when water having a high brine content is unavailable, may reduce the formation permeability by swelling the water sensitive clays. In order to restore permeability to such a formation, injection of a heated non-aqueous fluid is utilized to cause the vaporization of the water and thereby dehydrate the clay materials adjacent the well bore. This thermal dehydration of the clay materials is irreversible, i.e., further swelling does not occur upon subsequent contact with an aqueous fluid, and increases the formation permeability allowing subsequent water injection at an increased rate.

A further advantage is provided when a non-aqueous fluid which is miscible with the hydrocarbons is employed. When a formation is saturated adjacent the well bore with hydrocarbons, injection of a non-aqueous fluid miscible with the hydrocarbons provides means for dispersion of the accumulated residues. If so desired, the injected fluid may be followed by an injection of an inert gas in order to displace the previously injected fluid prior to the resumption of production.

The heated non-aqueous fluid is generally injected into the formation via well for a period of approximately 5 to 7 days. At the end of this period, injection is terminated with the well then being closed and the injected fluids allowed to soak into the formation. During this period, the formation temperature is increased and any water contained in the formation interstices is vaporized and provides for a substantial pressure increase in the formation. Subsequently, the well pressure is reduced below the pressure within the formation and production of the hydrocarbons is resumed. Recovery of the injected fluids is generally accomplished within a period approximately equal to that of injection. The production thereafter is at a rate higher than that prior to treatment. If after a period of time, the production rate again declines, the treatment may be repeated as desired.

Thus, there has been shown and described an improved method of stimulating a hydrocarbon-bearing formation by means of injecting therein a heated non-aqueous fluid.

Other modifications and variations of the invention as hereienbefore set forth may be made without departing from the spirit and scope thereof, and therefore, only such limitations should be imposed as are indicated in the appended claims.

I claim:

1. A method of stimulating a subterranean hydrocarbon-bearing formation and containing water therein traversed by a well which comprises injecting into said formation via said well a hydrocarbon liquid having a vapor pressure below that of said water in said formation and consisting essentially of hydrocarbons having from five to eight carbon atoms at a temperature sufficient to vaporize a substantial quantity of said water contained in said formation, closing said well for a period sufficient to vaporize a substantial quantity of said water contained in said formation, and thereafter opening said well and producing hydrocarbons therefrom via said well by permitting the pressure within said formation to drive said hydrocarbons into said well.

2. The method of claim 1 wherein the permeability of said formation adjacent said well has been reduced because of the accumulation of hydrocarbons therein and said non-aqueous fluid is miscible with the accumulated hydrocarbons thereby causing dispersion thereof.

3. The method of claim 1 wherein said hydrocarbon liquid is selected from the group consisting essentially of naphtha, aromatics and combinations thereof.

4. The method of claim 3 wherein the aromatic hydrocarbon liquid is toluene.

References Cited

UNITED STATES PATENTS

| | | | |
|---|---|---|---|
| 1,152,392 | 9/1915 | Breitung et al. | 166—303 |
| 1,342,741 | 6/1920 | Day | 166—303 X |
| 2,286,724 | 6/1942 | Garrison | 166—303 |
| 2,788,855 | 4/1957 | Peterson | 166—303 |
| 3,120,264 | 2/1964 | Barron | 166—303 X |
| 3,294,167 | 12/1966 | Vogel | 166—272 |
| 3,333,637 | 8/1967 | Prats | 166—303 X |
| 3,357,487 | 12/1967 | Gilchrist et al. | 166—272 X |
| 3,358,762 | 12/1967 | Clossmann | 166—303 |

ERNEST R. PURSER, Primary Examiner

I. A. CALVERT, Assistant Examiner